United States Patent
Chu et al.

(10) Patent No.: US 9,191,889 B2
(45) Date of Patent: Nov. 17, 2015

(54) SLOT-BASED POWER SAVE IMPROVEMENT

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 152 days.

(21) Appl. No.: 13/952,397

(22) Filed: Jul. 26, 2013

(65) Prior Publication Data

US 2014/0029499 A1 Jan. 30, 2014

Related U.S. Application Data

(60) Provisional application No. 61/676,201, filed on Jul. 26, 2012.

(51) Int. Cl.
*H04W 52/02* (2009.01)
*H04W 74/04* (2009.01)
*H04W 72/04* (2009.01)

(52) U.S. Cl.
CPC ...... *H04W 52/0206* (2013.01); *H04W 52/0216* (2013.01); *H04W 72/0446* (2013.01); *H04W 74/04* (2013.01); *Y02B 60/50* (2013.01)

(58) Field of Classification Search
None
See application file for complete search history.

(56) References Cited

U.S. PATENT DOCUMENTS

| 8,547,853 | B2 | 10/2013 | Du et al. | |
| 8,634,336 | B2 | 1/2014 | Kang et al. | |
| 2007/0211727 | A1* | 9/2007 | Sethi et al. | 370/395.4 |
| 2010/0040033 | A1 | 2/2010 | Xhafa et al. | |
| 2011/0122780 | A1* | 5/2011 | Nieminen et al. | 370/252 |
| 2012/0275362 | A1 | 11/2012 | Park et al. | |

OTHER PUBLICATIONS

Park, M. et al., "Uplink Channel Access," IEEE 802.11-12/0606r0, May 2012, pp. 1-20.
IEEE Computer Society, "IEEE Standard for Information technology—Telecommunications and information exchange between systems—Local and metropolitan area networks—Specific requirements—Part 11: Wireless LAN Medium Access Control (MAC) and Physical Layer (PHY) Specifications," IEEE Std 802.11™-2007, Revision of IEEE Std 802.11-1999, Jun. 12, 2007, 19 pages.

(Continued)

*Primary Examiner* — Omar Ghowrwal
(74) *Attorney, Agent, or Firm* — Seed IP Law Group PLLC

(57) ABSTRACT

An access point (AP) associated with a several mobile stations (STAs) implements a slot-based power save poll (PS-Poll) method. The AP divides a slot-based access period into multiple time slots and allocates each time slot to either a STA determined to have slot-based PS-Poll capabilities or a STA determined to have buffered data present at the AP. The AP creates a traffic indication map (TIM) having a number of bits equal to the number of stations associated with the AP, and then transmits a beacon including the TIM. The TIM indicates to a slot-based PS-Poll capable STA which time slots are assigned to a selected set of associated stations. After receiving the beacon from the AP, the STA refrains from attempting to communicate with the AP outside the time slot assigned to the STA, yet transmits information to the AP during the time slot assigned to the STA.

17 Claims, 4 Drawing Sheets

(56) References Cited

OTHER PUBLICATIONS

IEEE Standards Activities Department, "Draft Standard for Information technology—Telecommunications and information exchange between systems—Local and metropolitan area networks—Specific requirements—Part 11: Wireless LAN Medium Access Control (MAC) and Physical Layer (PHY) Specifications—Amendment: Enhancements for Very High Throughput for operation in bands below 6GHz," IEEE Std 802.11ac™/D2.0, Jan. 2012, 359 pages.

Calcev et al., "Non-TIM Station in 11ah," 11-12-0610-00-00ah, May 2012, 11 pages.
Sandhya et al., "DL MU TXOP Power Save," IEEE 802.11-10/1302r0, Nov. 2010, 15 pages.
Sandhya et a., "Downlink TXOP Power Save," IEEE 802.11-11/0091r0, Jan. 2011, 9 pages.
Wentink et al., "Low Power Medium Access," IEEE 802.11-12/0114r0, Jan. 2012, 13 pages.
Wong et al., "PS-Poll for Downlink Bufferable Units," IEEE 11-12/1329r0, Nov. 2012, 15 pages.
Zheng et al., "Channel Access Supporting Low Power Operation," IEEE 802.11-12/0409r6, Jul. 2012, 13 pages.

* cited by examiner

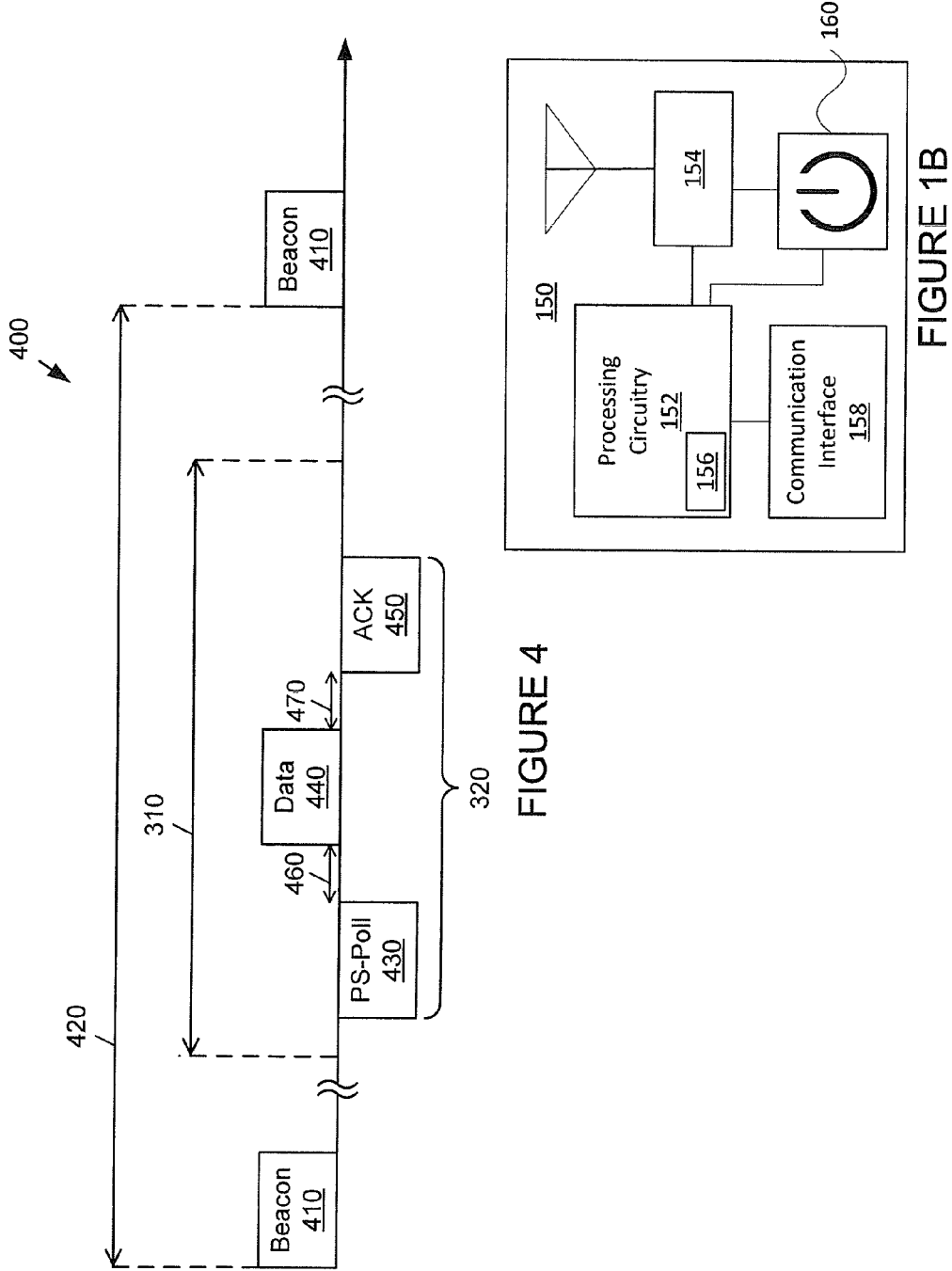

SLOT-BASED POWER SAVE IMPROVEMENT

CROSS-REFERENCE TO RELATED APPLICATIONS

The present application is related to the subject matter of U.S. Provisional Application No. 61/676,201 entitled "SLOT-BASED POWER SAVE IMPROVEMENT," filed on Jul. 26, 2012. The content of the above-identified patent documents is incorporated herein by reference.

TECHNICAL FIELD

The present application relates generally to wireless communication networks and, more specifically, to wireless communication networks implementing a slot-based power savings.

BACKGROUND

Devices using Institute for Electrical and Electronic Engineers (IEEE) 802.11 Wireless Fidelity (WiFi) and/or Wireless Local Area Network (WLAN) connectivity for Internet access are frequently either battery-powered or otherwise benefit from minimizing power consumption, particularly when not being utilized. The Distributed Coordination Function (DCF) of IEEE 802.11 provides a power saving mechanism (PSM) allowing nodes to remain silent in a sleep mode. However, various issues can cause actual use of the PSM to unnecessarily consume power.

Further improvement to slot-based power save poll is needed. There is, therefore, a need in the art for improved power save operation in using wireless network connections.

SUMMARY

IEEE 802.11ah implements low power WLAN technologies for applications in sensor networks. For example, the slot-based power save poll (PS-Poll) method is a WLAN technology applicable in sensor networks. An access point associated with a large number of mobile stations implements a slot-based power save poll (PS-Poll) method. The access point divides a slot-based access period into multiple time slots and allocates each time slot to either: a mobile station associated with the access point; a mobile station determined to have slot-based PS-Poll capabilities; or a mobile station determined to have buffered data present at the access point. The access point creates a traffic indication map (TIM) having a number of bits equal to the number of stations associated with the access point, and then transmits a beacon including the TIM. The TIM combined with slot-based access period information indicates to a slot-based PS-Poll capable STA which time slots are assigned to a selected set of associated stations. In response to receiving and decoding the TIM and slot-based access period information received within the beacon frame, the mobile station sets a network allocation vector (NAV) and refrains from attempting to communicate with the access point outside the time slot assigned to the mobile station. The mobile station transmits information to the access point during the time slot assigned to the STA.

An access point associated with a large number of mobile stations implements a slot-based PS-Poll method, in which the access point creates a slot-based access period during which only is allocated to the slot-based mobile stations, and then transmits a beacon including the slot-based access period. During the slot-based access period, only slot-based STAs are allowed to communicate with the access point. In response to receiving and decoding the slot-based access period, the mobile stations that do not support slot-based access sets a network allocation vector (NAV) and refrains from attempting to communicate with the access point. In response to receiving and decoding the slot-based access period, the mobile stations and APs in the overlapping basic service set (OBSS) sets a network allocation vector (NAV) and refrains from attempting to transmit frames.

The access point saves power by not allocating a time slot to a mobile station that is not slot-based PS-Poll capable. The mobile station in the BSS that is not slot-based PS-Poll capable saves power by not transmitting frames during the slot-based access period, and by sending an indication of slot-based PS-Poll capabilities. The mobile station and AP in overlapping BSS saves power by not transmit frames during the slot-based access period.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1B illustrates a WiFi device 150 in accordance with various embodiments of the present disclosure;

FIG. 4 illustrates a beacon interval timeline for a portion of communications employed during slot-based power save improvements in accordance with various embodiments of the present disclosure;

DETAILED DESCRIPTION

FIGS. 1 through 5C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system or device.

Figure 1A:
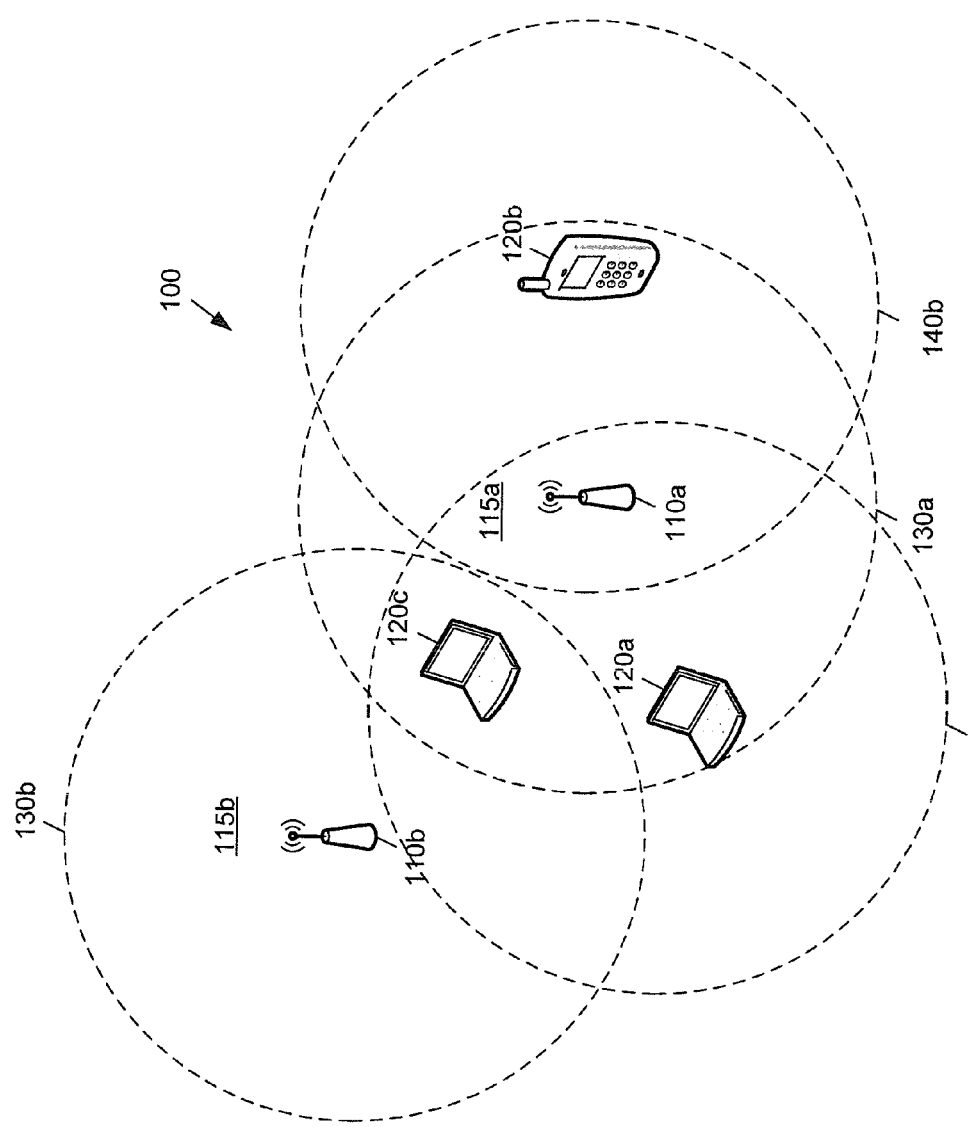
FIG. 1A illustrates a wireless local area network (WLAN) environment in which slot-based power save improvements in accordance with various embodiments of the present disclosure are implemented.

FIG. 1A illustrates a wireless local area network (WLAN) environment in which slot-based power save and the slot-based power save improvements in accordance with various embodiments of the present disclosure are implemented. WLAN environment 100 includes a basic service set (BSS) 115a of an IEEE 802.11 wireless local area network. The BSS 115a includes, in the simplistic example shown, an access point (AP) 110a that is connected to the Internet (not shown) and a plurality of stations (STAs, also called "nodes" or "clients") 120a and 120b located within coverage area 130a of AP 110a. STAs 120a and 120b are visible to the AP 110a and can communicate with the AP 110a. The reception area 140a is the coverage area of STA 120a, and reception area 140b is the coverage area of station 120b. STA 120a supports slot-based power save, and STA 120b does not support slot-based power save.

In some circumstances, WLAN environment 100 also may include an overlapping BSS 115b including AP 110b that is connected to the Internet and one or more STAs 120c located within the coverage area 130b of AP 110b. As shown, the coverage area 130b of AP 110b overlaps the coverage area 130a of AP 110a, such that a STA 120c communicating with AP 110b may be within the coverage area 130a of AP 110a. In implementing slot-based power save improvements in accordance with the present disclosure, consideration should be given to the possibility of such circumstances, as discussed in further detail below.

When the coverage area 130a for an AP 110a includes a significant number of STAs (for example, up to approximately 6,000 STAs), a hidden node scenario may occur in which STAs 120a and 120b are each individually visible to and able to communicate with the AP 110a but are not visible to each other, and do not receive any of the transmissions by the other. In FIG. 1A, for example, STA 120a is outside the reception area 140b of STA 120b and STA 120b is outside the reception area 140a of STA 120a, although both are within the coverage area 130a of the AP 110a and the AP 110a is within the respective reception areas 140a and 140b of STAs 120a and 120b. In other words, STA 120a is effectively "hidden" from STA 120b, and STA 120b is likewise "hidden" from STA 120a. As a result, STA 120b may attempt to communicate with AP 110a at the same time and on the same channel as STA 120a, producing a collision of a frame sent to the AP 110a by STA 120b with a frame sent to the AP 110a by STA 120a. Neither frame will be accurately received by AP 110a, which instead simply receives a corrupted frame.

Slot-based medium access methods may avoid some of the hidden node problem. One possible slot-based power save system is described in IEEE 802.11-12/606r0 entitled "Uplink Channel Access," the content of which is hereby incorporated herein by reference. In that proposed system, a beacon frame (BEACON) includes a traffic indication map (TIM) information element (IE). The TIM indicates whether the AP transmitting the respective IE has any buffered frames for each STA within the BSS including the AP.

The AP allocates different slots to the STAs that support slot-based medium access. The slot information in the beacon indicates a matching between the slots and the power save STAs that support slot-based access. There are multiple possible matching algorithms: one-to-one matching between slot and the power save STA that supports slot-based access; and multiple power save STAs that support slot-based access may also be matched to the same one slot. The STAs that support slot-based medium access are not allowed to access the wireless medium during the slots of other STAs. So hidden node problem among STAs that support slot-based medium access in the same BSS is avoided. As an example, the frame sequence in a slot can be uplink PS-Poll (from STA to AP) followed by a downlink DATA frame (from AP to STA) followed by an uplink Acknowledgement (also referred to as ACK) frame (from STA to AP).

However, the hidden node problem between STAs that support slot-based access (e.g. STA 120a) and don't support slot-based access (e.g. STA 120b) still exists. For example when STA 120a transmits PS-Poll to AP 110a, STA 120b transmits a frame to AP 110a when the backoff timer of STA 120b is 0. This can create a collision.

Also the hidden node problem between STAs that support slot-based access (e.g., STA 120a) and overlapping basic service sets (also referred to as OBSS STAs/APs) still exists. For example, the hiding node problem may still exist between STA 120c and AP 110b. Also for example, when STA 120a transmits a PS-Poll to AP 110a, STA 120c acknowledges the received frame from AP 110b.

If STAs 110b that do not support slot-based access and STAs and APs in an OBSS do not access medium during the slot-based access period, the collision between STAs that support slot-based access and STAs that do not support slot-based access can be avoided. Also, the collision between STAs that support slot-based access and STAs and APs in an OBSS can be avoided.

FIG. 1B illustrates a WiFi device 150 according to various embodiments of the present disclosure. Although certain details will be provided with reference to the components of the WiFi device 150, it should be understood that other embodiments may include more, less, or different components. The WiFi device 150 includes the access point 110a, 110b and the STAs 120a, 120b, and 120c (singly, "WiFi device").

The WiFi device 150 includes electrical processing circuitry 152, a transmitter, and a receiver. In certain embodiments, the WiFi device 150 includes a transceiver 154, which includes a transmitter and a receiver and an antenna. The processing circuitry 152 performs the functions (for example, employing the slot-based PS-Poll method according the present disclosure) of the WiFi device 150 with aid from the other components within the WiFi device. The processing circuitry 152 includes a processor coupled to a memory 156 and other components within the WiFi device. In certain embodiments, the memory 156 is included within the processing circuitry 152.

The memory 156 includes any suitable volatile or nonvolatile storage and retrieval device(s). For example, the memory 156 can include any electronic, magnetic, electromagnetic, optical, electro-optical, electro-mechanical, or other physical device that can contain, store, communicate, propagate, or transmit information. The memory 156 can store data and instructions for use or execution by the processor.

Other components of the WiFi device 150 includes a communication interface 158 for communicably coupling the WiFi device to external devices, and a power source 160 for providing electrical energy to the components of the WiFi device.

Figure 2:
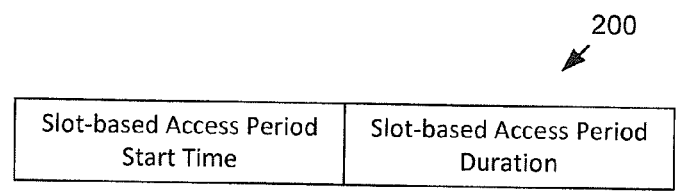
FIG. 2 illustrates a slot-based access period information employed by slot-based power save improvements in accordance with various embodiments of the present disclosure.

FIG. 2 depicts the slot-based access period information in the beacon employed by slot-based power save improvements in accordance with various embodiments of the present disclosure. The slot-based access period 200 depicted in FIG. 2 represents the information included in a Beacon for a BSS 100a that includes the start time and the duration of the slot-based access period which is part of the beacon interval that follows the Beacon carrying the slot-based access period information. In the slot-based access period, there are multiple slots allocated to the slot-based access capable STAs, such as STAs 120a in FIG. 1A.

With slot-based medium access improvement, the hidden node problem is solved because the STAs do not collide with each other during the slot-based access period. When the STAs 120*b* that do not support slot-based access receive the slot-based access period information in the BEACON, each of the STAs 120*b* will set its NAV according to the slot-based access period information and will not transmit frames during the slot-based access period. When the STAs and APs in an OBSS (also referred to as OBSS STAs/APs) receive the slot-based access period information in the BEACON, the STAs and APs in an OBSS (e.g., STA 120*c*, AP 110*b*) will set its NAV according to the slot-based access period information and will not transmit frames during the slot-based access period.

Figure 3:
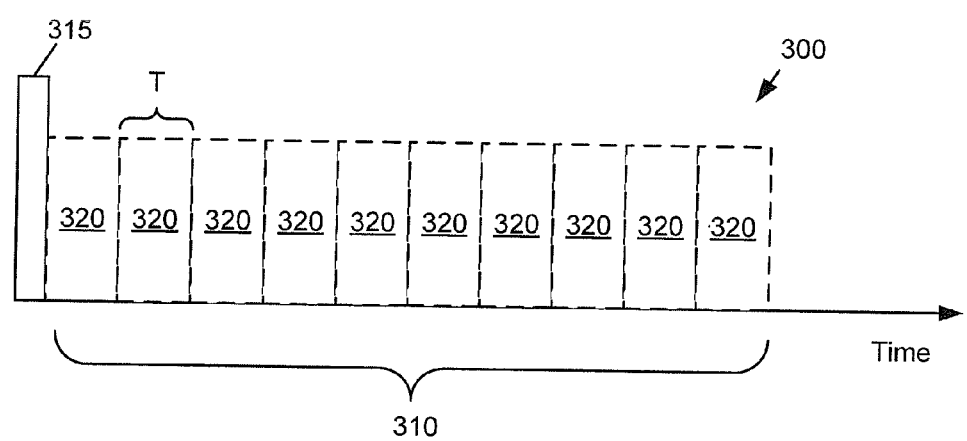
FIG. 3 illustrates a slot-based access period employed by slot-based power save improvements in accordance with various embodiments of the present disclosure.

FIG. 3 illustrates a slot-based access period employed as part of slot-based power save improvements in accordance with various embodiments of the present disclosure. The timeline 300 depicted in FIG. 3 includes a slot-based access period 310 having time slots 320 assigned to STAs that support slot-based access. In the example shown, the slot-based access period 310 occurs immediately after the EDCA beacon, although the slot based access period 310 may alternatively be scheduled to occur after a defined interval following the EDCA beacon which allows for example the AP to transmit broadcast frames before the slot based access period or the AP to allocate multiple slot based access periods in a beacon interval. The slot-based access period 310 in FIG. 3 includes all time slots 320 for each of the STAs that support slot-based access and have buffered packets at the access point; time slots are not assigned to STAs that do not support slot-based access. Thus, for example, when ten (10) slots are allocated, the slot-based access period 310 is divided into ten (10) time slots 320 (i.e., N=10). The start time of the first slot is the slot-based access period start time.

Each time slot 320 has a time slot duration T, resulting in a total slot-based access period duration of N×T (or 10T in the exemplary embodiment). The time slot duration (T) may be chosen to be large enough to complete Power Save-Poll (PS-Poll)/trigger, a Short Inter-Frame Space (SIFS), a DATA transmission, a second SIFS, and an acknowledgement ACK (where the PS-Poll, DATA, and ACK are each transmitted in a time slot). For example, the time slot duration (T) may be chosen to be between approximately 20-40 milliseconds (ms). The time slot duration T may be fixed during design and implementation or may be allowed to vary during operation of the network.

FIG. 4 illustrates a beacon interval timeline for a portion of communications employed during slot-based power save improvements in accordance with various embodiments of the present disclosure. Timeline 400 illustrates a relevant portion of communications that occur between consecutive transmissions of a beacon frame 410 (BEACON) by an AP 110*a* to STAs within one BSS 115*a*. The time between two BEACONs is a beacon interval 420, which includes a slot-based access period 310. The slot-based access period, in turn, includes one or more time slots 320. During each individual time slot 320, a power save poll (PS-Poll) control frame 430 is transmitted by the STA that was assigned the respective time slot, a data frame (DATA) 440 is transmitted by the AP, and an acknowledgement frame 450 (ACK) is transmitted by the STA that was assigned the respective time slot. A short inter-frame space (SIFS) 460 is present between the PS-Poll 430 and the DATA 440, and another SIFS 470 is present between DATA 440 and ACK 450.

In the circumstance of overlapping BSSs 115*a* and 115*b* depicted in FIG. 1, STAs communicating through AP 110*b* (although physically located within the coverage area 130*a* of AP 110*a*), such as STA 120*c* in FIG. 1, do not decode the TIM IEs and the slot information broadcast by AP 110*a*. Accordingly, the OBSS STA 120*c* does not know either the slot-based access period start time and length or the slot assignments during the slot-based access period. As a result, the hidden node problem remains present since STA 120*c* could transmit during a time slot assigned by AP 110*a* to one of STAs STA1 through STA10. Assuming AP 110*a* is within transmission range of STA 120*c* (which is logical, since STA 120*c* receives transmissions by AP 110*a* and accordingly is likely to transmit with sufficient power to reach AP 110*a*), transmissions by STA 120*c* could coincide with transmissions by one or more of STAs STA1 through STA10 and result in corrupt frames at AP 110*a*. In other words, the OBSS STA 120*c* does not know the reservation of time during the slot-based access period that the AP 110*a* assigned to STAs that support slot-based access and, as a result, may attempt to transmit to AP 110*b* during the slot-based access period 310 resulting in a collision at AP 110*a*.

To avoid such collisions resulting from the hidden node problem across overlapping BSSs, in the beacon frame 410, the slot-based access period 310 is indicated and identified by the AP 110*a*. The information in the beacon frame includes the start time of the slot-based access period 310 (although this is not required and/or may be set to null if the slot-based access period 310 always and/or by default starts immediately after the beacon frame 410) and the length (duration) of the slot-based access period in milliseconds per transmission unit (ms/TU) or the like. The OBSS STA 120*c*, while not decoding IEs broadcast by AP 110*a*, does decode beacon frames 410 received from AP 110*a*. In response to receiving a beacon frame 410 indicating a slot-based access period 310, the OBSS STA 120*c* (and any similarly situated STAs) sets the network allocation vector (NAV) for the STA 120*c* so that no attempt to access the wireless medium is made during the identified slot-based access period 310.

The NAV for a STA is a counter within a STA, the value of which indicates an amount of time that must elapse until the communication medium become free. A non-zero NAV value indicates to the STA that the AP is busy and, in response to such a non-zero value, the STA will not attempt to access the channel. As long as the NAV of the station is non-zero, the STA decrements the NAV at a uniform rate until the value reaches zero. A NAV value of zero indicates to the STA that the AP is not busy, such that the STA may attempt to access the wireless medium for communication with the access point. In accordance with the present disclosure, the NAV of an OBSS STA 120*c* may be set to a value that will not expire until after the slot-based access period 310 ends. Thus, even though the AP 110*a* is technically not busy (and the AP 110*b* is not necessarily busy), the STA 120*c* will not attempt to access the channel until after the slot-based access period has elapsed.

Not all STAs in a BSS will necessarily implement slot-based access. A station may be designed without support for slot-based access to simplify implementation, or for other reasons. As a result, due to the ad hoc nature of 802.11 networking, a BSS may include power-save STAs that support slot-based access, power-save STAs that do not support slot-based access, and non-power-save STA(s). For instance, STA 120*a* in FIG. 1A may be a power-save STA that supports slot-based access, while STA 120*b* may be a non-power-save STA or a power-save STA that does not support slot-based access.

If an AP 110*a* does not clearly indicate the slot-based access period 310 start time and duration, each non-power-save STA or power-save STA that does not support slot-based access 120*b* within the BSS 115*a* would need to decode the slot information or TIM IE to avoid the hidden node problem.

Normally, however, non-power-save STAs or the power-save STAs that do not support slot-based access within the BSS 115*a* associated with AP 110*a* are not configured to decode slot information or TIM IEs, since such information has no apparent utility to a STA that does not implement PSM or a power-save STA that does not support slot-based access. Nor is it desirable to burden the non-power-save STA or the power-save STA that does not support slot-based access 120*b* with decoding the slot information or TIM IEs of AP 110*a*.

However, when a STA does not decode the slot information or TIM element, that STA may be unaware of the slot-based access period start time and duration. In other words, the non-power-save STA or the power-save STA that does not support slot-based access is unaware of the slot-based access period and the assigned slots and, as a result, may attempt to communicate with the AP 110*a* during the slot-based access period, and specifically during one or more time slots assigned to power-save STAs that support slot-based access, which may cause a collision.

The potential hidden node problem resulting from the presence of non-power-save STAs or the power-save STAs that do not support slot-based access within a BSS is addressed in the same manner described above for avoiding OBSS collisions. That is, the slot-based access period 310 is indicated and identified by the AP 110*a* in the beacon frame 410, including the start time of the slot-based access period 310 (unless starting immediately after the beacon frame 410 by default) and the duration in ms/TU or the like. Therefore the non-power-save STA or the power-save STA that does not support slot-based access 120*b* need not decode slot information or TIM IEs broadcast by AP 110*a*, the non-power-save STA or the power-save STA that does not support slot-based access 120*b* already (necessarily) decodes the slot-based access period start time and duration in beacon frames 410 received from AP 110*a*. In response to receiving a beacon frame 410 indicating a slot-based access period 310, each non-power-save STA 120*b* or the power-save STA that does not support slot-based access (and any similarly situated STAs) sets the NAV for the STA 120*b* so that no attempt to access the wireless medium is made during the identified slot-based access period 310.

Power save STAs may implement techniques or methods for saving power other than the slot-based PS-Poll PSM described above. As with non-power-save STAs, such designs may be selected to simplify implementation of the STA. Thus, for example, STA 120*b* in FIG. 1A may correspond to STA11 without slot-based access capability and the corresponding slot-based access period 310 of FIG. 3, rather than with STA12 that doesn't support slot-based access. In that case, STA11 120*b* may be a power-save STA that does not support or implement slot-based PS-Poll.

However, if an AP allocates a slot within the slot-based access period 310 to power-save STA11 120*b* that does not implement slot-based PS-Poll, then the slot is wasted. Such allocation of a slot forgoes an opportunity for transmissions by STAs that support slot-based PS-Poll, or for other communication.

According to the present disclosure, an AP 110*a* will not allocate slots to a power-save STA11 120*b* that does not have slot-based PS-Poll power save capabilities. In FIG. 3, the AP 110*a* assigns time slots 320 only for the STAs STA1 through STA10 in the BSS 115*a*, each of which has slot-based PS-Poll capabilities. In accordance with the present disclosure, the AP 110*a* does not allocate a time slot 320 to STA11 because that STA does not have slot-based PS-Poll capability. (AP 110*a* also did not allocate a time slot 320 to STA12, which is still considered to correspond a non-power-save STA in this example).

To ensure allocation of time slots 320 only to STAs with slot-based PS-Poll capabilities, a slot-based power save indication is defined. The slot-based power save indication is defined to differentiate slot-based PS-Poll power save STAs from non-slot-based PS-Poll power save STAs. The slot-based power save indication may be included within an Extended Capabilities IE transmitted by each STA, or a new element. The AP 110*a* receives such slot-based power save indications from the STAs within the BSS 115*a* and aggregates the information, using the indications to determine which STAs should be allocated.

Figure 5A:
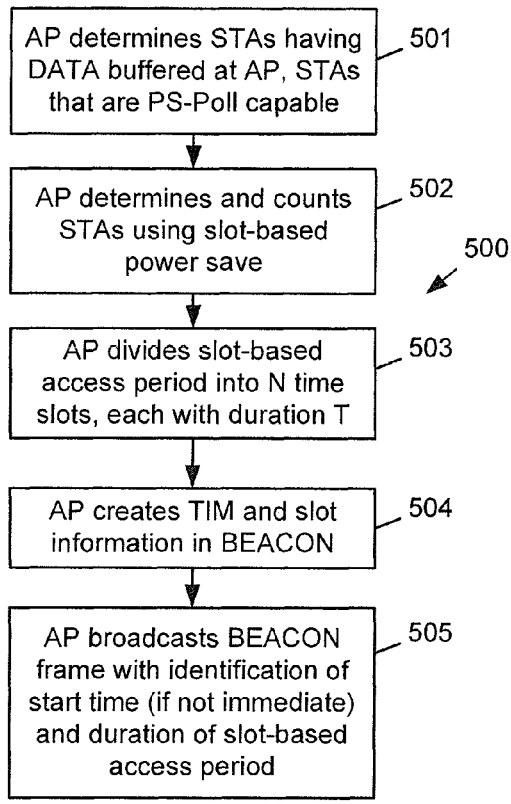
FIG. 5A illustrates a high level flow chart for a process or method executed within an access point for implementing an improved slot-based power save medium access in accordance with various embodiments of the present disclosure.
Figure 5C:
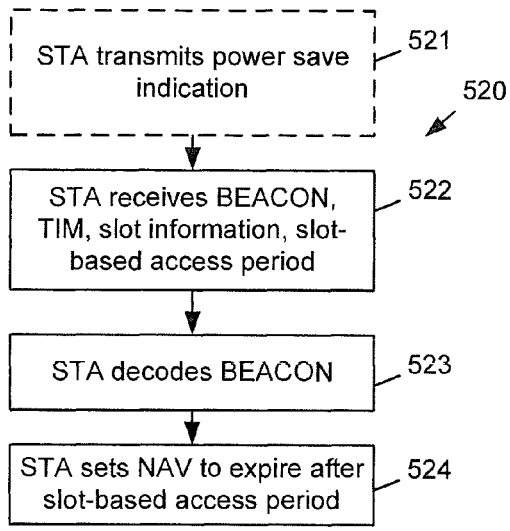
FIG. 5C illustrates a high level flow chart for process or method executed within each station that is an OBSS STA, an OBSS AP, a non-power-save station or a station that implements power save in a manner other than PS-Poll in accordance with various embodiments of the present disclosure.
Figure 5B:
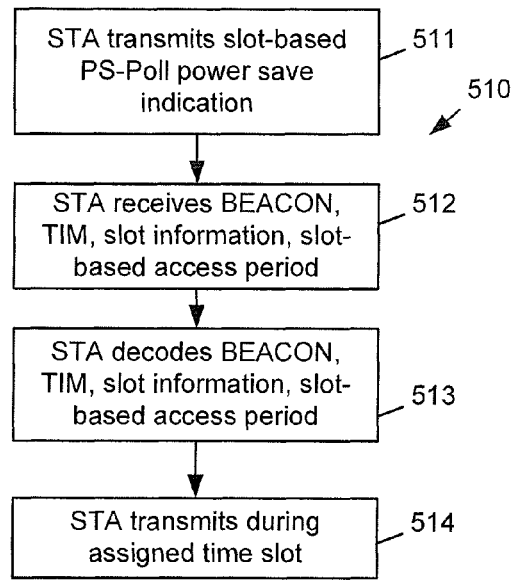
FIG. 5B illustrates a high level flow chart for a process or method executed within a PS-Poll power save capable station for implementing improved slot-based power save medium access in accordance with various embodiments of the present disclosure.

FIGS. 5A through 5C are high level flow charts for processes performed within a wireless network implementing slot-based power save improvements in accordance with various embodiments of the present disclosure are implemented. While each flow chart depicts a series of sequential steps, unless explicitly stated no inference should be drawn from that sequence regarding specific order or performance, performance in series rather than concurrently or in an overlapping manner, or performance exclusively without the occurrence of intervening or intermediate steps. Moreover, those skilled in the art will recognize that a complete process is not illustrated or described. Instead, for simplicity and clarity, only so much of the respective processes as is unique to the present disclosure or necessary for an understanding of the present disclosure is depicted and described.

FIG. 5A illustrates a process or method 500 executed within an AP for implementing an improved slot-based power save medium access. The AP receives PS-Poll power save indications from one or more STAs in the BSS having buffered DATA at the AP and determines which STAs support PS-Poll power save operation (step 501). The AP then determines which STAs of the BSS have slot-based PS-Poll capabilities (step 502), and by inference deduces which STAs do not implement power-save and/or do not support PS-Poll power save. As described above, the number N of STAs with buffered data at the AP that have slot-based PS-Poll capabilities is used to assign time slots.

After counting the number of STAs having PS-Poll power save capabilities, the AP determines (step 503) a slot-based access period based on the number of such STAs and a duration T, which is either selected during design, standardized, or dynamically set by the BSS based on current conditions. The slot-based access period is logically treated by the AP as N time slots, each of which is assigned to one or more of the PS-Poll power save capable STAs that support slot-based access by creation of a TIM, or slot information (excluding slot-based access period start time and duration) (step 504) that is then broadcast by the AP in a BEACON. Before, concurrently with or following generation of the TIM and broadcast of the TIM IE the broadcasts a BEACON containing an identification of the slot-based access period, including the start time (if not defined by default) and the duration (step 505).

FIG. 5B illustrates a process or method 510 executed within a PS-Poll power save capable STA that support slot-based access for implementing improved slot-based power save medium access. The STA transmits a PS-Poll power save indication in an IE to the AP as described above (step 511), and subsequently receives a BEACON and TIM IE, slot-based access period information and slot information—although not necessarily in that order—broadcast by the AP (step 512). The STA determines the start and duration of the slot-based access period from the received BEACON, and decodes the received TIM IE, slot-based access period information and slot information to determine which time slot was assigned to the respective STA (step 513). During the subsequent slot-based access period, the STA waits until the assigned time slot to transmit (step 514) and does not transmit during the slot-based access period outside the assigned time slot—that is, does not transmit during slot-based access period time slots either before or after the assigned time slot.

FIG. 5C illustrates a process or method 520 executed within each STA that is (a) not part of the BSS of the AP, or (b) not capable of slot-based access (i.e., that is either a non-power-save STA or a STA that implements power save in a manner other than slot-based access). The STA optionally transmits an indication relating to power save capabilities, if any, within the STA (step 521). Alternatively, the STA may simply not transmit the PS-Poll power save indication described above, leaving the AP to infer that the STA is not PS-Poll power save capable. The STA receives a BEACON from the AP (step 522). In addition, the STA is capable of receiving (i.e., buffering for later decoding) the TIM IE transmitted by the AP, but need not do so. The STA decodes the BEACON (step 523) to determine when the slot-based access period starts, and the duration of the slot-based access period. Finally, the STA sets the STA's NAV to a value that will count down after lapsed of the entire slot-based access period. As a result, the STA will not attempt to transmit in the channel until after the slot-based access period (as long as the NAV is non-zero).

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like'. The term "device" means any apparatus, system, machine, thing, item, construct, or any part thereof. The term "controller" means any device or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

While this disclosure has described certain embodiments and generally associated methods, alterations and permutations of these embodiments and methods will be apparent to those skilled in the art. Accordingly, the descriptions of example embodiments do not define or constrain this disclosure. Other changes, substitutions, and alterations are also possible without departing from the spirit and scope of this disclosure, as defined by the following claims.

Although the present disclosure has been described with an exemplary embodiment, various changes and modifications may be suggested to one skilled in the art. It is intended that the present disclosure encompass such changes and modifications as fall within the scope of the appended claims.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. An access point device, comprising:
a transceiver configured to communicate with mobile stations; and
processing circuitry configured:
to associate with a plurality of stations,
to receive from one or more of the plurality stations one or more signals, each of the one or more signals indicating whether one of the plurality of stations has slot-based Power Save-Poll (PS-Poll) capabilities, wherein each of the one or more signals differentiates the one of the plurality of stations having slot-based PS-Poll capabilities from a non-slot-based power save station,
to determine a number of stations having slot-based PS-Poll capabilities within the plurality of associated stations based on the one or more signals,
to divide a slot-based access period into a plurality of time slots,
to allocate the slot-based access period per the number of the stations determined to have slot-based PS-Poll capabilities,
to allocate each time slot of the plurality of time slots to each of the plurality of stations having buffered data present at the access point device and determined to have slot-based PS-Pall capabilities; and
to transmit a first beacon frame including an indication of slot-based access period information.

2. The access point device of claim 1, wherein the processing circuitry is further configured to determine whether an associated station has buffered data present at the access point.

3. The access point device of claim 1, wherein the processing circuitry is further configured to assign each time slot of the plurality of time slots to the stations determined to have slot-based PS-Poll capabilities.

4. The access point device of claim 1, wherein the processing circuitry is further configured to assign each time slot of the plurality of time slots to the stations determined to have buffered data present at the access point device and stations.

5. The access point device of claim 1, wherein the processing circuitry is further configured to not assign a time slot to a station that does not have slot-based power save capabilities.

6. The access point device of claim 1, wherein the first beacon frame includes an identification of a start time of the slot-based access period and a duration of the slot-based access period.

7. A mobile station, comprising:
a transmitter and receiver configured to communicate with an access point; and
processing circuitry configured:
to associate with the access point configured to divide a slot-based access period into a plurality of time slots;
to receive a first beacon frame from the access point, the first beacon frame including an indication of a time slot assigned to the mobile station;
in response to receiving the first beacon frame, to set a network allocation vector (NAV) and refrain from attempting to communicate with the access point during the slot-based access period; and
to transmit a signal that indicates to the access point whether the mobile station has slot-based Power Save-Poll (PS-Poll) capabilities, wherein the signal differentiates the mobile station having slot-based PS-Poll capabilities from a non-slot-based power save mobile station.

8. The mobile station or claim 7, wherein the processing circuitry is further configured to receive a second beacon frame from an access point with which the mobile station is not associated.

9. The mobile station of claim 7, wherein the beacon frame includes an identification of a start time of the slot-based access period and a duration of the slot-based access period.

10. The mobile station of claim 7, wherein the processing circuitry is further configured to transmit information to the access point outside the slot-based access period.

11. The mobile station of claim 7, wherein the processing circuitry is further configured to set the NAV to expire at the end of the slot-based access period.

12. A non-transitory computer-readable medium encoded with executable instructions that, when executed, cause processing circuitry to:
associate with a plurality of stations;
receive from one or more of the plurality of stations one or more signals, each of the one or more signals indicating whether one of the stations has slot-based Power Save-Poll (PS-Poll) capabilities, wherein each of the one or more signals differentiates the one of the plurality of stations having slot-based PS-Poll capabilities from a non-slot-based power save station:
determine a number of stations having slot-based Power Save-Poll (PS-Poll) capabilities within the plurality of associated stations based on the one or more signals;
divide a slot-based access period into a plurality of time slots;
allocate the slot-based access period per the number of stations determined to have slot-based PS-Poll capabilities;
allocate each time slot of the plurality of time slots to each of the plurality of stations having buffered data present at the access point device and determined to have slot-based PS-Poll capabilities: and
transmit a first beacon frame including an indication of the slot-based access period information.

13. The computer-readable medium of claim 12, wherein the instructions, when executed, further cause processing circuitry to: not assign a time slot to a station that does not have slot-based power save capabilities.

14. The computer-readable medium of claim 12, wherein the instructions, when executed, further cause processing circuitry to: include in the first beacon frame an identification of a start time of the slot-based access period and a duration of the slot-based access period.

15. The computer-readable medium of claim 12, wherein the instructions, when executed, further cause processing circuitry to: assign each time slot of the plurality of time slots to the stations determined to have slot-based PS-Poll capabilities.

16. An access point device, comprising:
a transceiver, which in operation, communicates with a plurality of mobile stations;
a processor coupled to the transceiver; and
a memory coupled to the processor, the memory storing processor-executable instructions that, when executed by the processor, cause the access point device to:
associate with the plurality of mobile stations;
receive from one or more of the plurality of mobile stations one or more signals, each of the one or more signals indicating whether one of the mobile stations has slot-based Power Save-Poll (PS-Poll) capabilities, wherein each of the one or more signals differentiates the one of the plurality of mobile stations having slot-based PS-Poll capabilities from a non-slot-based power save mobile station;
determine a number of mobile stations having slot-based Power Save-Poll (PS-Poll) capabilities within the plurality of mobile stations based on the one or more signals;
allocate a plurality of slots included in a slot-based access period based on the number of the mobile stations determined to have slot-based PS-Poll capabilities;
allocate each time slot of the plurality of time slots to each of the plurality of mobile stations having buffered data present at the access point device and determined to have slot-based PS-Poll capabilities; and
transmit a beacon frame including an indication of slot-based access period information.

17. A method comprising:
associating an access point device with a plurality of mobile stations;
receiving from one or more of the plurality of mobile stations one or more signals, each of the one or more signals indicating whether one of the mobile stations has slot-based Power Save-Poll (PS-Poll) capabilities, wherein each of the one or more signals differentiates the one of the plurality of mobile stations having slot-based PS-Poll capabilities from a non-slot-based power save mobile station;
determining a number of mobile stations having slot-based Power Save-Poll (PS-Poll) capabilities within the plurality of mobile stations based on the one or more signals;
allocating a plurality of slots included in a slot-based access period based on the number of the mobile stations determined to have slot-based PS-Poll capabilities;
allocating each time slot of the plurality of time slots to each of the plurality of mobile stations having buffered data present at the access point device and determined to have slot-based PS-Poll capabilities; and
transmitting a beacon frame including an indication of slot-based access period information.

* * * * *